Figure 1:
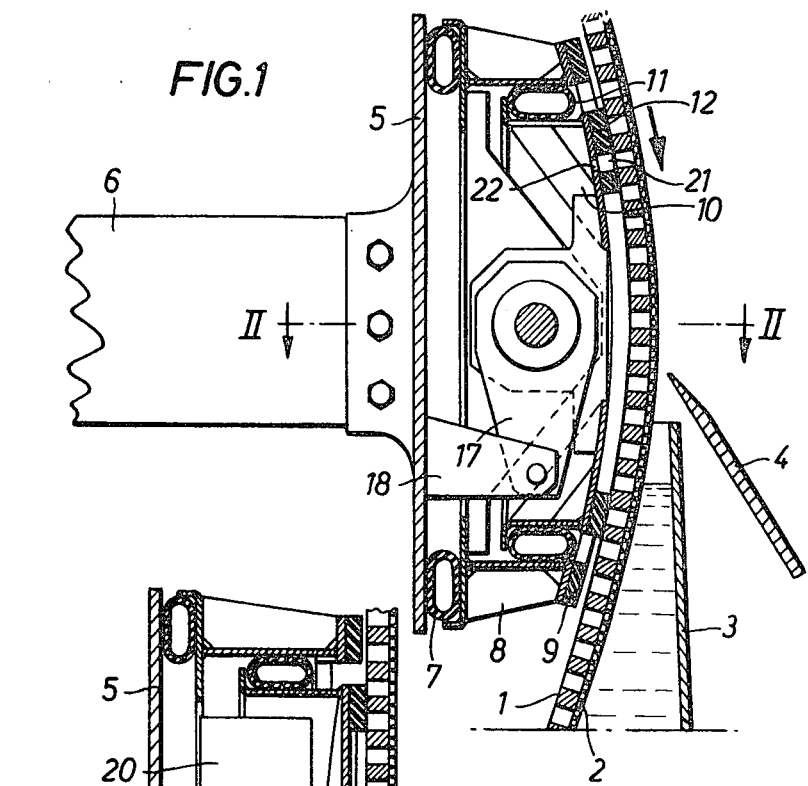

United States Patent

Heckmann

[15] 3,638,797
[45] Feb. 1, 1972

[54] NONCELLULAR ROTARY VACUUM FILTER

[72] Inventor: Wolfgang Heckmann, Bergisch-Gladbach, Germany

[73] Assignee: Klockner-Humboldt-Deutz Aktiengesellschaft, Cologne-Mulheim, Germany

[22] Filed: Apr. 23, 1970

[21] Appl. No.: 31,207

[30] Foreign Application Priority Data

Apr. 29, 1969 Germany .................... P 19 21 717.5

[52] U.S. Cl. ............................................. 210/393, 210/402
[51] Int. Cl. ............................................................. B01d 33/06
[58] Field of Search ......................... 210/391–393, 402

[56] References Cited

UNITED STATES PATENTS

| 916,481 | 3/1909 | Noyes | 210/391 X |
| 2,352,303 | 6/1944 | Young | 210/393 X |

FOREIGN PATENTS OR APPLICATIONS

| 1,121,749 | 8/1956 | France | 210/393 |
| 1,006,396 | 4/1957 | Germany | 210/393 |

*Primary Examiner*—John Adee
*Attorney*—Singer, Stern & Carlberg

[57] ABSTRACT

A noncellular vacuum filter is provided in its interior with a blast chamber supplied with compressed air which is used for removing the filter cake from the outer circumference of a cylindrical filter drum. The blast chamber is formed by two telescoping sealing frames, both of which carry each a continuous flexible sealing bar extending all around the frames and which are adapted to engage the inner wall of the filter drum when the frames are radially moved outwardly by eccentrics on an eccentric shaft mounted in bearings carried by a baseplate closing the outer sealing frame opposite the side which has said sealing bar mounted thereon. A slot in the upper portion of the sealing bar attached to the inner sealing frame is in communication with apertures in said inner sealing frame so that compressed air from the blasting chamber is jet-like discharged and directed through the wall of the filter drum to remove the filter cake from the outer face of said drum.

9 Claims, 2 Drawing Figures

PATENTED FEB 1 1972

3,638,797

INVENTOR
Wolfgang Heckmann
BY
Singer, Stern & Carlberg
ATTORNEYS

NONCELLULAR ROTARY VACUUM FILTER

The invention relates to a noncellular rotary vacuum filter with a blasting chamber stationarily arranged in the interior of the filter drum, the walls of said blasting chamber being sealed with respect to the inner chamber of the filter drum and discharging in the feed conduits for a gaseous and/or liquid pressure and/or rinsing agent for blasting off the filter cake and for the cleaning of the filter cloth.

The German Pat. No. 975,333 discloses already a noncellular rotary vacuum filter, in which in the removal zone in the interior of the drum a sealed chamber is arranged, which is provided with a frame-shaped sealing bar, which is pressed against the inner wall of the drum. In this chamber enter the feed conduits for a gaseous and/or liquid pressure or rinsing agent, respectively, for blasting off the filter cake and if necessary for the cleaning of the filter cloth. In this known arrangement, the sealing bar and the drum wall, on account of the pressure force and the rotation of the filter drum undergo a constant wear, as the inner wall of the drum is never completely free from adhering solid particles. In addition, the pressure force of the sealing bars require an additional expenditure of driving energy. With respect to the wear of the sealing bars, a relatively hard quality of rubber must be selected, while the inner wall of the drum must not have any depressions because the sealing bars, on account of their low elasticity would not engage the wall sufficiently close to clean it. Therefore either a very accurately machined and therefore expensive inner wall of the drum is necessary, or one must be satisfied with a lower vacuum and with a reduced yield of the filter.

The object of the invention is a noncellular rotary vacuum filter, in which the disadvantages of the known construction are prevented. This is accomplished according to the invention, in that the wall of the blasting chamber has at least two sealing frames boxed into one another (or telescoped), elastically and gastight and connected with chamber parts, said sealing frames being provided on their side facing the drum wall each with a continuous elastic flexible sealing bar, and of which each is arranged movable in itself, and being in connection with an eccentric drive, in such manner, that the movement of both sealing frames takes place in the same direction and with a phase displacement of 360° times the number of the sealing frames.

The advantage of this arrangement is that during the rotation of the filter drum, the sealing frames, on account of the movement in the same direction and the phase displacement are alternatingly pressed against the inner wall of the drum. Apart from a low relative movement between the drum wall and the sealing bar, in each case at the point of time of engagement with the drum wall, no frictional strain takes place of the sealing bars. Therefore a wear of the sealing bars is prevented to a fargoing extent. As for this reason substantially more elastic material than previously may be used for the sealing bars, the latter adhere very well to the drum wall, so that a complete sealing effect is attained.

Of advantage in this connection it is to have the outer sealing frame connected elastically and gastight with a stationary baseplate, and the inner sealing frames are in each case connected elastically and gastight with the sealing frame surrounding them on the outside.

In developing the invention, it is recommended that in the blasting chamber an eccentric shaft connected with a motor is positioned with at least one eccentric for each sealing frame, whereby the eccentric in each case is arranged offset by 360° per number of the sealing frames, and is disposed in the associated sealing frame. This arrangement brings it about that with a rotation of the eccentric shaft the sealing frames perform with reference to the axis of rotation of the eccentric shaft a translating circular movement, and as they are alternatingly pressed with elastic deformation of the sealing bar against the inner wall of the drum, they move the drum in direction of the rotation of the eccentric shaft, so as to effect simultaneously a rotation of the filter drum.

In further developing the invention, it is suggested that for the feed of the pressure means for blasting off the filter cake in the sealing bar of the inner sealing frame, which is disposed above the liquid level of the trough filling, a slot is formed while in the sealing frame itself corresponding passage apertures are arranged. With such a construction, the feed of the pressure medium is advantageously limited to a narrowly restricted space in the removal zone for the filter cakes, so that with small quantities of air at high speed, an effective release of the filter cake is attained. As the slot is disposed in the sealing bar of the inner frame, the vacuum in the interior of the drum is effectively maintained with the aid of the outer movable sealing frame.

In a still further development of the invention, it is suggested that the baseplate, for the change in the pressure force of both sealing frames is adjustably slidably arranged in radial direction with reference to the axis of the filter drum. This construction has the advantage, that in case of a standstill and pressure relief of the baseplate of the blasting chamber, both sealing frames are lifted from the inner wall of the drum, so that the filter drum may be further rotated manually. A manhole is arranged in the usual manner in an end wall of the filter drum and therefore the interior of the drum is at all times accessible for carrying out any desired maintenance work therein.

In another embodiment of the invention it is suggested that the elastic seal between the outer sealing frame and the baseplate which is arranged in the interior of the drum is constructed as a tube and that the tube be connected by a supply or feed conduit with a source of pressure outside of the drum filter. Also this development insures a change in the contact pressure. Likewise it is possible after relief of the tube to rotate the filter drum manually. With this embodiment, suitably the positioning of the eccentric shaft on the baseplate is carried out with reference to the axis of the drum filter movably in radial direction, so that the positioning of the eccentric shaft may be adapted to a slidably shifting movement.

In addition, it is suitable to arrange in the feed conduit for the blasting air a valve which periodically opens and is so controlled by the eccentric shaft, that the valve opens only then when the sealing bar provided with the slot engages the inner wall of the drum. Owing to this procedure, it is assured that when a high vacuum exists in the interior of the drum, the compressed air ordinarily used for the blasting operation cannot pass into the interior of the drum, when the contact pressure upon lifting one or the other sealing bar is lowered for a short period of time.

With these and other objects in view, the invention will now be further described with reference to the accompanying drawings which illustrates by way of example one preferred embodiment.

Figure 2:
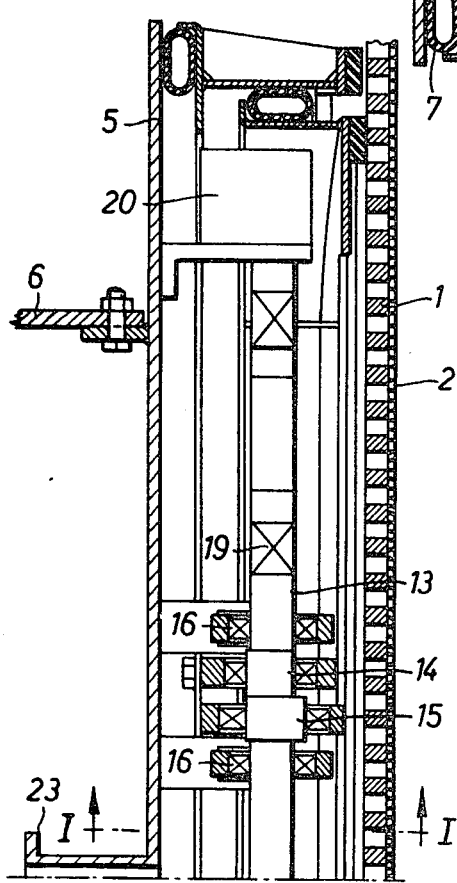

In the drawings:

FIG. 1 illustrates a vertical partial cross-sectional view of a noncellular rotary vacuum filter, and FIG. 2 illustrates a horizontal longitudinal section along the line II—II of FIG. 1.

Referring to FIG. 1, the perforated sieve drum 1, whose outer surface is covered by a finely porous filter layer 2, made for example, of a textile fabric, is arranged approximately up to the one-half of its size in a horizontal trough 3 filled with the sludge to be filtered. Above the upper edge of the trough wall and close to the outer drum wall, extends a discharge board 4, over which the filter cake on the outer surface of the drum blasted by compressed air coming from the inside of the drum is discharged. In order to make the blasting of the filter cake from the inside of the drum possible without the vacuum in the filter drum being disturbed by the compressed air customarily used for the blasting operation, the removal zone must be sealed in the interior of the drum in the area of the compressed air feed from the vacuum chamber. For this purpose, according to the invention, there is secured on a baseplate 5, which is fixed to a stationary support 6 in the interior of the drum an outer sealing frame 8 with the intermediary arrangement of a frame-shaped elastic tube 7 connected with a source of pressure. The sealing frame 8 is provided on its side facing the inner wall of the drum with a continuous elastic sealing bar 9 along its entire edge. Within the sealing frame 8 is telescopically arranged an inner sealing frame 10, which is connected by another elastic tube seal 11 with the outer sealing frame 8. On its side facing the inner wall of the drum, this sealing frame 10 is also provided with a continuous elastic sealing bar 12 extending along the entire edge of the frame 10.

According to FIG. 2 an eccentric shaft 13 is rotatably mounted parallel to the axis of the drum on the baseplate 5. This shaft 13 by way of example has arranged thereon two double-eccentrics 14, 15, offset by 180° to one another. The eccentric shaft in accordance with the invention, is radially movably relatively to the drum axis, namely in such manner, that the two axially spaced shaft bearings 16 are positioned each in a lever 17, which is pivotally positioned in a bearing block 18 fixedly mounted on the baseplate 5. The eccentric 14 of the double-eccentrics connected by a bearing with the sealing frame 8 and the eccentric 15 is connected by a bearing with the sealing frame 10. By means of intermediate elastic couplings 19, the eccentric shaft is rotated in suitable manner by a hydraulic motor 20, which compared with an electromotor has a higher reliability when arranged in the interior of the drum and permits in a simple manner a regulation of the number of revolutions. If now the hydraulic motor rotates the eccentric shaft, then both sealing frames described with reference to the axis of rotation of the eccentric shaft a translatory circular movement, so that the sealing frames 8 and 10 are pressed with their sealing bars alternately against the inner wall of the drum. The baseplate of the entire arrangement is so adjusted that the elastic sealing bars in their farthest position in each case as compared with the inner wall of the drum are evenly lifted. On account of the circular movement of the two sealing frames and the elastic deformation of their sealing bars, the drum is accordingly set in rotation corresponding to the direction of rotation of the eccentric shaft.

As shown in FIG. 1, the portion of the sealing bar 12 disposed above the liquid level of the sludge in the trough of the inner sealing frame 10 is provided with a horizontal slot 21 extending over the entire length of the frame. The sealing frame itself is provided on its bearing surface for the sealing bar with a plurality of apertures 22 in alignment with said slot 21. For the blasting of the filter cake, compressed air is admitted into the tubular drum shaft and from here into the inner part or interior of the drum. By means of a branch conduit, (not shown) this compressed air is then conducted through an inlet opening 23 in the baseplate 5 and into the sealed chamber formed within the sealing frames 8 and 10. From this chamber the compressed air passes as a narrow jet extending over the entire length of the drum through the apertures 21 of the sealing frame 10 and then through the apertures of the filter drum, and blasts then the filter cake disposed on the exterior of the drum, so that it may run off over the discharge board 4.

The contact force necessary for the sealing operation may be adjusted by providing the two tube seals 7 and 11 with separate feed conduits, which introduce a pressure medium from the outside, or the baseplate is arranged to be slidable as a whole in radial direction. This for example may be accomplished with the aid of a corresponding screw-threaded arrangement on the support 6 or by the intermediary connection of hydraulic or pneumatic devices of known type.

What I claim is:

1. A noncellular rotary vacuum filter comprising a filter drum, means forming a blasting chamber within said filter drum, said blasting chamber having walls which are sealed with respect to the interior of the filter drum, and conduits for a pressure medium used for blasting the filter cake from the filter drum connected with said blasting chamber, wherein the improvement comprises that the walls of the blasting chamber are formed by at least two telescopically connected outer and inner sealing frames between which are arranged elastically and gastight sealing means, said sealing frames being provided on their side facing the inner wall of the drum each with a continuous elastic flexible sealing bar, each of which is being arranged to be movable in itself, and an eccentric drive (14, 15) connected with said sealing frames in such a manner that the movement of both sealing frames takes place in the same direction and with a phase displacement of 360°.

2. A noncellular rotary vacuum filter, according to claim 1, in which the outer sealing frame is connected elastically and gastight with a stationary baseplate and that the inner sealing frame is connected elastically and gastight with the outer sealing frame which surrounds the inner sealing frame.

3. A noncellular rotary vacuum filter according to claim 1 including an eccentric shaft arranged in the blasting chamber adjacent said baseplate, a motor connected with said eccentric shaft, said shaft being provided with at least one eccentric for each sealing frame, whereby the eccentrics in each case are arranged offset by 360° per number of the sealing frames and are positioned in the associated sealing frames.

4. A noncellular rotary vacuum filter according to claim 1, including a slot in a portion of said sealing bar for supplying the pressure medium for the blasting of the filter cake, said slot being disposed above the liquid level of the trough of the filter, said slot being in communication with passages in said sealing frame, and said passages being in communication with said blasting chamber.

5. A noncellular rotary vacuum filter, according to claim 1, in which the baseplate of the blasting chamber for the purpose of altering the contact pressure of the sealing bars is arranged slidable in radial direction of the filter drum.

6. A noncellular rotary vacuum filter, according to claim 2, in which the elastic connection between the outer sealing frame and the baseplate comprises a tubular member, said tubular member being connected by a feed conduit with a source of pressure outside of the drum filter.

7. A noncellular rotary vacuum filter according to claim 3, including spaced bearings for said eccentric shaft mounted fixedly on said baseplate.

8. A noncellular rotary vacuum filter according to claim 3, in which said hydraulic motor for rotating said eccentric shaft is fixedly mounted on said baseplate.

9. A noncellular rotary vacuum filter according to claim 4, including a feed conduit supplying said blast chamber with a pressure medium and a valve in said feed conduit which is opened periodically, and is so controlled that the valve opens only then when the sealing bar provided with said slot engages the inner wall of said drum.

* * * * *